Dec. 29, 1970   R. T. ALLSOP   3,550,243
METHOD AND TOOL FOR DRIVING SELF-TAPPING SCREWS
Filed June 19, 1968   3 Sheets-Sheet 2

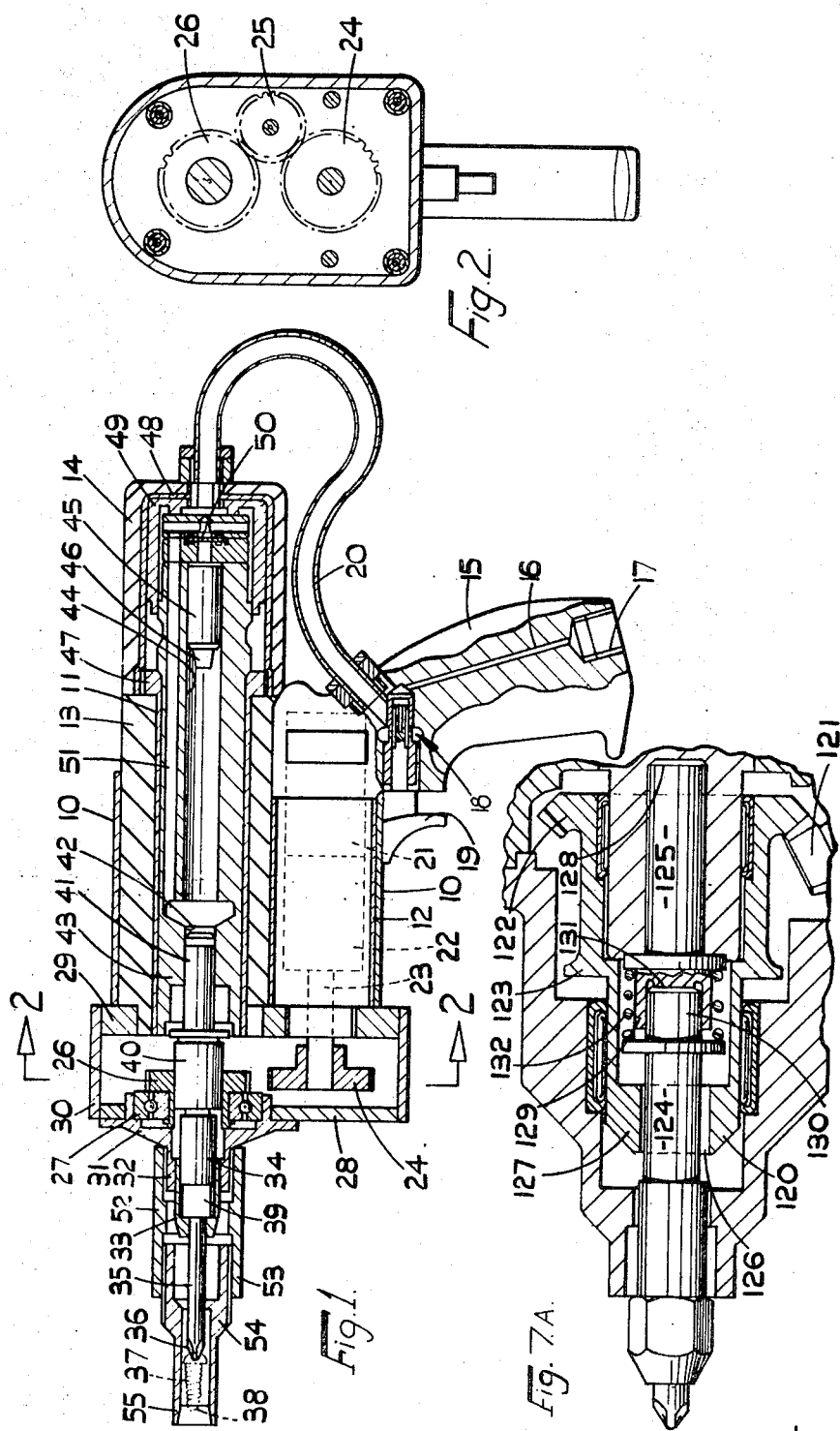

INVENTOR:
ROBERT TREVOR ALLSOP
BY Kurt Kelman
AGENT

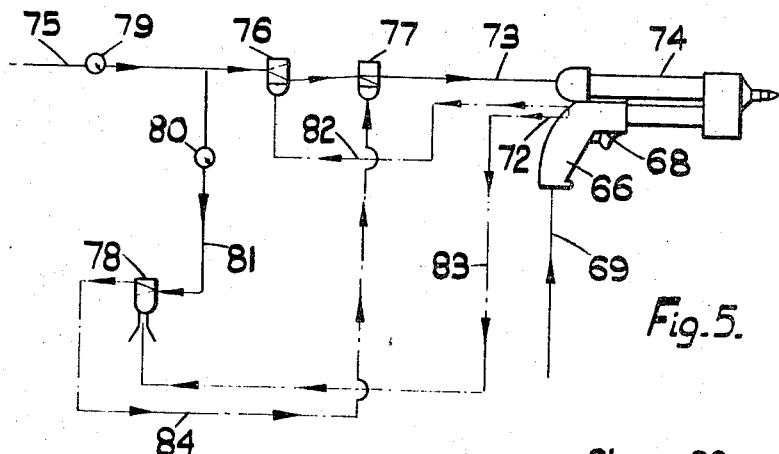
Fig.5.
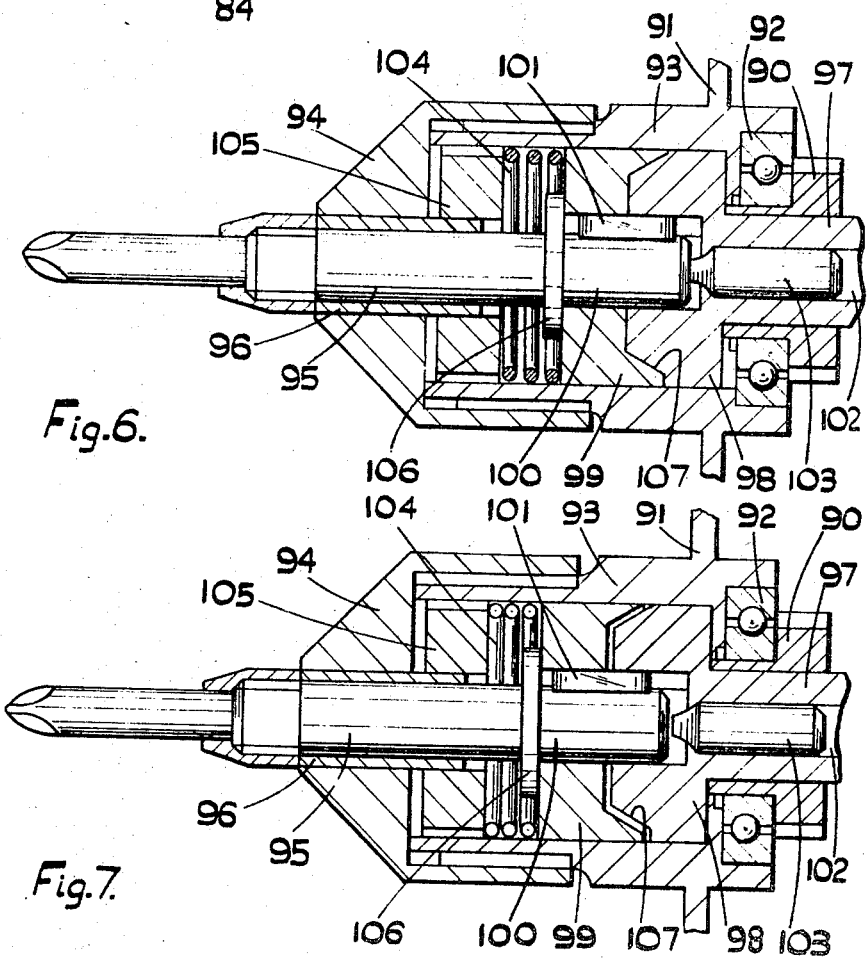
Fig.6.
Fig.7.
INVENTOR:
ROBERT TREVOR ALLSOP
BY Kurt Kelman
AGENT

# United States Patent Office 3,550,243
Patented Dec. 29, 1970

3,550,243
METHOD AND TOOL FOR DRIVING SELF-TAPPING SCREWS
Robert Trevor Allsop, "Pinetrees," Beechlawn Drive, Stourton, near Stourbridge, Worcester, England
Continuation-in-part of application Ser. No. 678,944, Oct. 30, 1967. This application June 19, 1968, Ser. No. 738,222
Claims priority, application Great Britain, June 23, 1967, 28,981/67, 28,982/67; Oct. 7, 1967, 45,977/67
Int. Cl. B23p 19/06; B25d 9/04; B23f 3/00
U.S. Cl. 29—240
9 Claims

ABSTRACT OF THE DISCLOSURE

A method of driving a self-tapping screw having a piercing point into sheet metal in which the power-operated tool applies rotary torque simultaneously with vibratory impacting to the screw to cause it to pierce its own pilot hole in the workpiece and also tap its way into the workpiece. The power-operated tool has a motor for rotating a screwdriver bit and an impacting device which includes a reciprocating piston which delivers a rapid series of impacts to the screwdriver bit simultaneously with the screwdriver bit being rotated by the motor. The tool may have embodied therein a control device which operates to relieve the screwdriver bit of the vibratory impacting after a predetermined period.

---

The present application is a continuation-in-part of my copending application Ser. No. 678,944, filed Oct. 30, 1967, now abandoned.

BACKGROUND OF THE INVENTION

(1) Field of the invention

This invention relates to a method and tool for driving self-tapping screws into sheet metal workpieces, for example, the securing of two or more metal sheets together, or the securing of a component part to a metal sheet.

The invention is concerned with a method and tool for driving a self-tapping screw which has a point formed to pierce its own pilot hole in a sheet metal workpiece, thus avoiding the necessity of having to provide a preformed pilot hole in the metal sheet for each screw.

(2) Description of prior art

To avoid the necessity for providing such preformed pilot holes there have been used certain self-tapping screws having drill points so that the screw drills its own pilot hole in the workpiece but these screws are not entirely satisfactory due to the fact that a certain amount of swarf is generated in the drilling operation and also because the speed of rotation of the screw required for the drilling part of the operation is generally much higher than the speed of rotation required when the screw is tapping its way into the workpiece. Also the manufacture of such a screw with a special drill point is generally more expensive than the manufacture of a conventional self-tapping screw.

There has been proposed a tool for driving such a pointed self-tapping screw in which an impact is given to the screw to cause it to pierce a pilot hole and then the tool rotates the screw to drive it into the metal sheet. Such prior proposal is not satisfactory for very thin sheet because the impact required to pierce the sheet can cause the sheet to buckle, nor is it satisfactory for the thicker metal sheets because single impacts are not sufficient to force the point of the screw right through the thicker metal sheet.

SUMMARY OF THE INVENTION

The object of the invention is to provide a method and tool for driving a self-tapping screw, having a piercing point, into a metal sheet which will be satisfactory for all thicknesses of metal sheet from the very thinnest up to the thickest encountered in practice.

According to the invention there is provided a method of driving a self-tapping screw, having a piercing point, into a sheet metal workpiece comprising the steps of:

(a) Engaging the point of the screw against the workpiece with the head of the screw engaged by a power-operated, rotary bit which is reciprocable in the axial direction of the screw, (b) Applying simultaneously to said bit, rotary torque and vibratory impacting to cause the point of the screw to form a pilot hole in the workpiece, and (c) Maintaining said vibratory impacting at least until the point of the screw has completely entered the workpiece to the full depth of the piercing point, the magnitude of each impact being such that the stress which is imposed upon any thread produced in the workpiece is below that stress which corresponds to the elastic limit of the metal of the workpiece.

The period of time during which the impacting is maintained, along with the rotary torque, is dependent upon the thickness of the metal sheet. Rotary torque is applied throughout the operation until the screw is fully tightened and, in the case of the thicker metal sheet, impacting may be continued for the same length of time as the effect of impacting is to considerably reduce the resistance to turning of the screw. With very thin sheet, however, the impacting should preferably cease as soon as the full depth of the piercing point has entered the metal sheet and, for sheets of intermediate thickness, the impacting may be continued for a time, dependent on the thickness of the sheet, while the thread is being formed in the sheet.

For the very thin sheets and sheets of intermediate thickness the period of time of application of vibratory impacting is preferably controlled automatically.

For example, one manner of automatic control is by means of a mechanical sensing device which can be preset so that after the point of the screw has penetrated a certain distance into the workpiece, which is at least the full depth of the point, the effect of vibratory impacting is removed from the bit with which the screw is engaged.

Alternatively, there may be a timing device which controls automatically the period of time during which vibratory impacting is applied to the bit.

In another form, there may be a sensing device which is responsive to the resisting torque encountered by the screw as it is being driven, and which operates to relieve the bit of the effect of the vibratory impact when such resisting torque reaches a predetermined value.

Further, according to the invention, one form of tool for carrying out the method of the invention comprises a body in which is mounted a screwdriver bit capable of rotary motion about its axis and reciprocatory sliding motion in the direction of its axis, a motor for rotating the bit, and a power-operated device which delivers a series of impacts in the axial direction to the screwdriver bit simultaneously with the operation of the motor to rotate the screwdriver bit.

In addition, there may be a mechanical sensing device comprising a spacer member on the front end of the tool body adjacent the screwdriver bit, and engageable with the workpiece, the spacer member being mounted on the body so as to be adjustable thereon in the axial direction of the screwdriver bit, the arrangement being that the position of the outer end of the spacer member in relation to the body of the tool, determines the extent to which the screwdriver bit projects axially from the front of the body when the screw, engaged by the bit, has its point resting against the workpiece.

Alternatively, the screwdriver bit may include a clutch sensitive to the resisting torque encountered by the screw being driven and adapted to operate upon a certain resisting torque being encountered to relieve the screwdriver bit of the effect of the vibratory impact.

BRIEF DESCRIPTION OF THE DRAWINGS

Certain forms of tool for carrying out the method according to the invention are illustrated in the accompanying drawings and described hereinafter by way of example and in such drawings:

FIG. 1 is a cross-section taken vertically through one form of tool.

FIG. 2 is a section on the line 2—2 of FIG. 1.

FIG. 5 is a diagrammatic layout of the circuit of the pneumatically operated timing device for the tool shown in FIGS. 3 and 4.

FIG. 6 is a fragmentary view of the forward end only of another form of tool for carrying out the invention.

FIG. 7 is a view similar to FIG. 6 showing the working of the tool,

FIG. 7a is a fragmentary view showing a modification.

DESCRIPTION OF PREFERRED EMBODIMENTS

Figure 4:
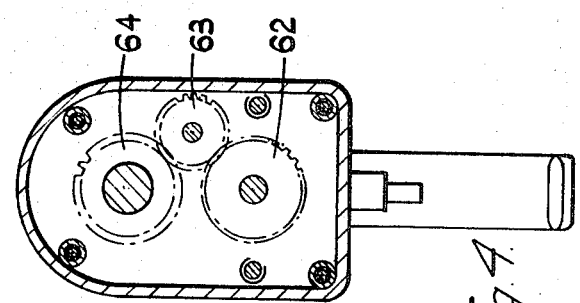
FIG. 4 is a section on the line 4—4 of FIG. 3.

With reference to FIG. 1, the tool shown there comprises an outer casing 10 within which is mounted a tubular housing 11 for the vibratory impacting device and below the housing 11 a further tubular housing 12 for the motor which rotates the screwdriver bit. In order to reduce the noise effect of the impacting device, the housing 11 is enclosed in a sleeve of rubber, indicated at 13, and also the rear portion of the tool body is enclosed in a housing 14 of rubber.

Secured to the body of the tool is a hand grip portion 15 in which is an inlet passage 16 for air under pressure which is supplied from a suitable source such as a mains through a flexible tube which would be connected by a suitable adapter to the internally threaded adapter connection 17 in the hand grip portion 15. Embodied in the hand grip portion 15 is a valve mechanism of generally known form and indicated generally at 18, such valve mechanism being controlled by a trigger 19 which, when actuated, operates the valve mechanism 18 to admit air to the impacting device via the flexible pipe 20 and also admits air to a known form of air motor indicated at 21 and housed within the tubular housing 12 and driving a reduction gear generally indicated at 22.

The output shaft 23 from the reduction gear 22 has fixed on its outer end a gear wheel 24 which, as shown in FIG. 2, meshes with an idler gear wheel 25 in mesh with a further gear wheel 26 mounted in a bearing 27 supported in the front plate 28 which is part of the front section of the body of the tool, there being a rear plate 29 and an outer enclosing casing 30 covering the gear wheel transmission from the shaft 23 to the gear wheel 26.

The front plate 28 has mounted therein a cap 31 which has a forwardly axially projecting sleeve portion 32 in which is fixed a support sleeve 33 which provides support for the forward part of the screwdriver bit now described.

This screwdriver bit, indicated generally at 34, has an extreme forward shaft portion 35, the extreme end of which is formed with a screw-engaging portion 36, in this example shown as a generally known form of cruciform screwdriver blade formation for engaging in a correspondingly shaped cruciform recess in the head of a screw 37 engaged with the portion 36 of the screwdriver bit, such screw 37 having a piercing point 38.

The part 39 of the screwdriver bit is of cylindrical form and is slidably and rotatably supported in the support sleeve 33 whilst towards the rearward end of the screwdriver bit there is a driving portion 40 which is slidably and nonrotatably engaged in the central opening through the gear wheel 26.

The rearwards end 41 of the screwdriver bit is of cylindrical form and is slidably and rotatably supported in a cylindrical cross-section passage 42 provided in a generally cylindrical block 43 fixed within the housing 11, this block 43 forming part of a known type of vibratory impact device hereinafter briefly described.

Within the block 43 is a cylindrical cross section passage 44 axially aligned with the passage 41, and thus with the screwdriver bit, and freely slidably mounted in such passage 44 is a free moving impact piston 45 having at its forward end a reduced nose section 46. Secured to the flange 47 on the housing 11 is a further rearwardly projecting housing 48 within which is disposed a cylindrical member 49 housing a known form of flutter valve device generally indicated at 50 and the block 43 has extending therethrough a number of ports, such as the one indicated at 51, and the known arrangement is such that so long as air under pressure is supplied to the valve mechanism 50, via the flexible inlet pipe 20, the impact piston 45 performs a continuous reciprocation within the passage 44 in the block 43, such reciprocation continuing until the supply of compressed air via inlet pipe 20 is cut off.

Thus the continual reciprocation of the impact piston 45, above referred to, results in a series of impacts being delivered by the nose 46 of the piston 45 against the rear end of the reduced section 41 of the screwdriver bit. Thus, by this means a vibratory impacting is applied to the screwdriver bit 34 and thus to the screw 37 engaged therewith. The tool so far described can be used for driving screws into the thicker gauges of metal sheet (e.g. above about $\frac{1}{16}$" thickness for steel).

Where the tool is to be used for driving screws into thin metal sheet or sheet of thickness in the intermediate range (i.e. below about $\frac{1}{16}$" thickness) then means are fitted to automatically determine the period of time during which the vibratory impacting of the piston 45 is applied to the rear end of the screwdriver bit. A mechanical sensing device which is one form of such automatic means is hereinafter described.

The sleeve portion 32 of the cap 31 is externally threaded and has secured thereon an axially directed sleeve 52, having at its one end an internal thread for engaging with the externally threaded sleeve portion 32 and having at its forward end 53 an internally threaded portion in which is threadedly engaged a spacing sleeve member 54 having a forwardly extending portion 55 which is adapted to be engaged against the surface of the workpiece into which the screw 37 is driven and which also encloses, and projects forwardly of, the end 36 of the screwdriver bit.

The members 52 and 54 above described, comprise the mechanical sensing device which determines the extent of vibratory impacting applied to the screwdriver bit 34 and the following explanation is given to show how the application of vibratory impacting is removed from the screwdriver bit 34 at a certain instant determined by the setting of the sensing device 52, 54.

The apparatus is designed so that with the various parts of the mechanism in the position shown in FIG. 1, the extent of travel of the impact piston 45 from the right-hand end of the passage 44 to the left-hand end thereof, is such that the nose 46 of the piston fails to make contact with the end 41 of the screwdriver bit so that no impact is delivered to the screwdriver bit. If the sleeve member 54 is now screwed inwardly of the sleeve 52, by a distance such that the extreme end face of the part 55 lies in a plane which is coincident with the join between the piercing point 38 and the threaded part of the screw 37 then it will be appreciated that with the parts in the position shown, the adjustment of the sensing device by inward screwing of the member 54, will leave the piercing point 38 projecting the distance equal to its axial length beyond the extreme end face of the part 55 so that when the point 38 is engaged with a workpiece and the tool moved bodily forwards until the part 55 also engages the workpiece, the screw will be moved rearwardly relative to the tool body thus moving the screwdriver bit rearwardly relative to the body of the tool so as to bring the end 41 of the screwdriver bit into the path of reciprocatory movement of the impact piston 45.

Thus with the parts set in this position, if the trigger 19 is actuated air is admitted simultaneously to the motor 21 and to the valve mechanism 50 to set in motion respectively the driving of the gears 24, 25, 26 and the vibratory impacting of the piston member 45 and so long as the trigger 19 is held in the depressed position, rotation of the screwdriver bit will continue and also operation of the vibratory impacting device will continue.

However, the effect of the vibratory impacting upon the screwdriver bit 34 is to cause the piercing point 38 to pierce its pilot hole in the workpiece and when the piercing point 38 has penetrated the workpiece to the full axial depth of the point, the screwdriver bit 34 has moved forwardly in relation to the body of the tool a distance such that its end 41 is now in the position as shown in the drawing and out of the path of reciprocatory moving of the impact piston 45 so that after this position has been reached, although the impacting device continues to operate, no further impacting is applied to the screwdriver bit 34 and thereafter so long as the trigger 19 is maintained depressed, only rotary torque is applied to the screwdriver bit 34 and thence to the screw 37.

In the preceding description of the adjustment of the sensing device 52, 54, it will be appreciated that the case being considered was that where the part 55 engages directly against the surface of the workpiece into which the screw is being driven. However, where there is an intervening part, such as another metal sheet or a component which is being secured to the metal sheet workpiece then, as will be appreciated, the part 54 will have to be screwed inwardly of the part 52 a further distance equal to the thickness of such intervening part as the extreme end 55 of the sensing device will now engage the surface of such intervening part.

The adjustment of the mechanical sensing device above described is for the case of very thin sheet where the impacting on the bit is removed after the point of the screw has pierced to its full axial depth. For slightly thicker sheet (below the figure of about $1/16''$) appropriate adjustment is made to allow the vibratory impacting to continue on the screwdriver bit for predetermined period (dependent on the actual sheet thickness) while the screw is forming the thread in the sheet.

Figure 3:
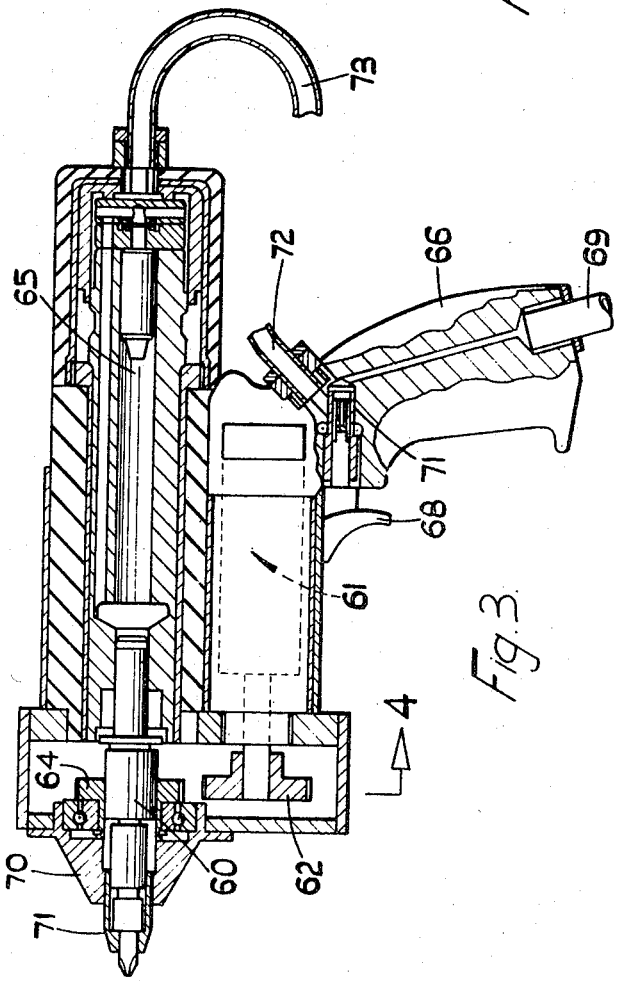
FIG. 3 is a section taken on the vertical line through another form of tool.

With reference now to the form of tool shown in FIGS. 3–5, the majority of the tool shown in FIGS. 3 and 4 is identical in construction with the tool shown in FIGS. 1 and 2 and, very briefly, comprises the rotary and axially slidable screwdriver bit 60 which is rotated from the air motor and reduction gear assembly 61 by the train of gears 62, 63, 64, and the vibratory impacting is applied to the screwdriver bit 60 by the same form of impacting device generally indicated at 65. The tool has a hand grip portion 66 as before, in which is a valve mechanism 67 operated by trigger 68 and also there is an inlet for air under pressure to which is connected a flexible pipe 69 for supplying the compressed air via the hand grip portion 66.

The forward end of the tool comprises the cap 70 and extension 71 rotatably and slidably supporting the screwdriver bit 60, and, as so far described, the tool is suitable for use on the thicker gauges of metal sheet (i.e. above about $1/16''$ thickness).

For use with metal sheet below about $1/16''$ thickness the tool of FIGS. 3 and 4 is modified and is primarily different from that of FIGS. 1 and 2 in that the extent of the vibratory impacting is now controlled by a time control device which, after a predetermined time, cuts off the supply of compressed air to the impacting device 65 whilst continuing the supply of compressed air to the air motor 61 for continued rotation of the screwdriver bit 60.

The valve 67 controls the supply of air to the motor 61 and also supply of air to the flexible pipe 72 which supplies air to a generally known form of time control device which is not shown embodied in the tool in FIG. 3, but is illustrated in the diagrammatic lay-out of FIG. 5. Such time control device would be incorporated in its own enclosure which would be suitably embodied in the body or handle of the gun or may be attached, for example, to the top of the gun as a separate entity.

The supply of compressed air for operating the impacting device 65 enters via the flexible pipe 73 and for further description of the time control device, reference is now made to FIG. 5, where the tool is indicated diagrammatically at 74 and the inlet connection 73 is shown and also the outlet 72 from the hand grip portion 66 of the tool; supply of air via outlet 72 being controlled by the valve 67 in the hand grip portion 66, which valve is, of course, actuated by the trigger 68.

The supply of compressed air from a mains or other suitable source to the hand grip portion 66 of the tool, is indicated by the line 69 in FIG. 5 and there is a further supply of air from such mains or other supply indicated by the line 75 in FIG. 5.

In the diagrammatic lay-out, 76 represents a known form of pneumatically operated valve which, when the tool is in the "at rest" position is normally closed and 77 represents a similar valve which is normally open when the tool is in the "at-rest" position, 78 represents a known form of pneumatically operated time delay valve embodying a dash pot device, which valve is normally in the closed position when the tool is at rest, 79 represents a valve for controlling the pressure of the supply from the mains inlet 75 and 80 represents a similar pressure control valve in a line 81 which supplies compressed air from the mains 75 and valve 79 to the time delay valve 78.

When the trigger 68 is actuated to open the valve mechanism 67, air is supplied to the motor 61 to commence the rotation of the screwdriver bit 60 and simultaneously air passes via the pipe 72 and a further line 82 to the valve 76 which, as mentioned above, is normally closed, but when air under pressure enters the valve from the line 82, this valve 76 is caused to open so as to admit the compressed air from the supply 75 through the valve 76 and valve 77 which is in the open state and thus via the inlet 73 to the impacting device 65 so that immediately the rotation of the screwdriver bit commences, the impacting device also comes into operation and vibratory impacting is applied also to the screwdriver bit 60.

Simultaneously with the supply of air via the line 82 to set the impacting device into operation, air under pressure is also supplied via the line 83 to the time delay valve 78 and thus actuates this valve so that after a predetermined period of time, depending upon the initial setting of the valve 78, this valve opens to admit air under pressure via line 81 and 84 to the valve 77 thus causing this valve to be closed and shut off the supply of air via the inlet 73 to the impacting device 65. It will be appreciated that supply of air to the motor 61 still continues after the valve 77 has closed and thus once the impacting device has halted there is continued rotation of the screwdriver bit 60 so long as the trigger 68 is held depressed and the valve 67 thus held open.

Upon the valve 67 being closed, the drive to the screwdriver bit ceases and as the air supply to the line 72 is cut off the system of FIG. 5 returns to its initial position with the valve 76 being closed, the valve 77 being open, and the time delay valve 78 returning to its closed position.

Referring now to FIGS. 6 and 7, there is shown in section the forward end of another form of tool having a sensing device which is adapted to operate so as to relieve the screwdriver bit of the effect of the vibratory impact when the resisting torque encountered by the screw being driven into a workpiece reaches a certain value.

Only the forward end of the tool is shown in FIGS. 6 and 7 because the remainder thereof is virtually identical with that shown in FIG. 1.

The gearwheel 90 of corresponds to the gearwheel 26 of FIG. 1 and the front plate 91 and bearing 92 correspond respectively to the front plate 28 and bearing 27 of FIG. 1. Extending forwardly from the front plate 91 is a nose sleeve 93 upon which is screwed the nose cap 94 and the screwdriver bit 95 is supported rotatably and slidably in a liner 96 carried in the nose cap 94.

Instead of the screwdriver bit engaging within the gearwheel 90 there is a separate tubular shaft 97 which engages within the gearwheel 90 in the same manner as the part 40 of the screwdriver bit in FIG. 1 engages within its gear wheel 26. At the forward end of the tubular shaft 97 there is formed integrally the one part 98 of a two-part clutch, the other part of which, indicated at 99, is mounted about the rear end 100 of the screwdriver bit. The screwdriver bit at the part 100 has a key 101 engaging with both parts 98 and 99 of the two-part clutch and thus the rotation of the tubular shaft 97, brought about by rotation of gearwheel 90, is transmitted directly to the screwdriver bit via the clutch part 98 and key 101.

The passage 102 in the tubular shaft 97 is in axial alignment with the tubular passage in the impact device which is not shown in FIGS. 6 or 7 but is the same as in FIG. 1, being the passage 44 and also the passage 42 and in this case the path of travel of the impact piston, shown here at 103, is from the extreme right hand end of its passage in the impact device to the left hand end of the passage 102. In FIG. 6 the impact piston 103 is shown at the extreme end of its operative movement and making contact with the end fact of the portion 100 of the screwdriver bit so as to deliver its axial impact on the screwdriver bit.

Apart from the introduction of the tubular shaft 97 the remainder of the construction of the tool of FIGS. 6 and 7 is identical with that shown in FIG. 1 considered to the right hand side of the gearwheel 90 corresponding to gearwheel 26 in FIG. 1.

As shown in FIG. 6, the clutch part 99 is spring urged into engagement with clutch part 98 by coil spring 104 acting between the forward face of clutch part 99 and a ring 105 fixed in the forward end of the sleeve 93, the ring 105 being threaded into the sleeve 93 so that its position can be adjusted to adjust the compression upon the spring 104. The forward face of the clutch part 99 is adapted to have engagement with a radially extending flange 106 on the screwdriver bit.

The operation of the tool above described, with reference to FIGS. 6 and 7, is best considered in relation to a particular case where it is desired to apply vibratory impact to the screwdriver bit along with rotation beyond the point where the piercing point of the screw has entered its full depth into the workpiece and up to the instant when the screw commences to tighten in the workpiece.

This instant will be, in effect, the point at which the underside of the head of the screw comes into engagement with the surface of the workpiece and at which point there is an increase in the torque resistance encountered by the screwdriver bit due to the increased frictional resistance to rotation brought about by the engagement of the head of the screw with the surface of the workpiece. It is at this instant that tightening of the screw in the workpiece commences.

The clutch parts 98 and 99 have engaging faces, indicates at 107, which are mutually cooperating and are designed so as to provide cam engaging surfaces such that when the screwdriver bit encounters torque resistance of a predetermined value the reaction between the engaging faces 107 of the two clutch parts results in an axially directed force acting upon the clutch part 99, tending to move it in the forwards direction away from the clutch part 98 and, as seen in FIG. 7, the result of this is that the clutch part 99 moves a short distance to the left, away from clutch part 98, compressing the spring 104 and also, by virtue of the engagement of clutch part 99 with the flange 106 on the screwdriver bit, carrying the screwdriver bit a short distance to the left, as seen in FIG. 7, with the result that the inner end of the screwdriver bit is brought out of the path of travel of the impact pistol 103 so that the piston 103 no longer makes contact with the screwdriver bit, and although reciprocation of the impact piston continues it does not deliver any further axial impacts to the screwdriver bit.

The magnitude of the torque at which the clutch part 99 is disengaged from the clutch part 98 can be varied by appropriate adjustment of the ring 105 to vary the compression of spring 104.

The modification shown in FIG. 7a relates to the forward part of the tool only and may be applied to either of the forms of tool shown in FIG. 1 and FIG. 3. In this modification the forward nose part of the tool is indicated at 120 and the end of the drive shaft from the air motor has fixed thereon a bevel gear 121. In this case the air motor is housed in the handle of the tool depending below the body thereof so that the axis of rotation of the air motor is at an acute angle to the axis of the screwdriver bit.

The bevel gear 121 drives a bevel gear 122 which is formed integrally at one end of a sleeve 123 which is rotatably mounted in the forward part of the body of the tool. In this case the screwdriver bit is in two separate parts indicated as a forward part 124 and a rearward part 125 and at its forward end the sleeve 123 has driving connection with the forward part 124 of the screwdriver bit such as by means of a spline connection, indicated at 126, which enables the screwdriver bit forward part 124 to slide relatively to the sleeve 123 whilst the sleeve 123 applies rotary torque to the forward part 124 of the screwdriver bit.

The vibratory impacting from the impact piston is applied to the rear end 128 of the part 125 of the screwdriver bit and at its forward end this part 125 has an axially projecting sleeve 129 which surrounds the rear end 130 of the part 124 of the screwdriver bit and there is a raised boss 131 within the sleeve 129 which engages the end face of the part 130 of the screwdriver bit. A coil compression spring 132 surrounds the sleeve 129 and acts between a flange on the part 124 and another flange on the part 125 of the screwdriver bit so that normally the spring 132 tends to urge the two parts of the screwdriver bit away from one another.

The spring 132 acts as a safety device in that when the tool is not in use it keeps the two parts of the screwdriver bit separated so that the end 130 is not in contact with the raised boss 131 so that if there is a screw engaged with the screwdriver bit and the gun is not in use but is accidentally operated, then the part 124 of the screwdriver bit will not be subject to any axial impact which might result in a screw being ejected in a dangerous manner. When the gun is required for use the operator has to exert a definite axial pressure upon the screwdriver bit in pressing a screw against the workpiece so as to compress the spring 132 and bring the two parts of the screwdriver bit into contact between the end 130 and the booss 131.

Thus, the inveniton provides a method and tool for driving self-tapping screws into sheet metal which can cover the whole range of thicknesses of sheet likely to be encountered in practice, the additional automatic means for governing the extent of vibratory impacting being used for sheets up to about $\frac{1}{16}''$ thickness.

In those cases where impacting is continued for some or all of the time that the screw is threading into the metal sheet, the effect of the impacting is to cause intermitent relaxing of the pressure between engaging faces of the screw thread on the screw and the thread being cut in the metal sheet and thus a reduction in the frictional resistance to the turning movement of the screw so that the screw can be driven more easily than is the case with an ordinary power-operated screwdriver driving a self-tapping screw into a predrilled pilot hole in a metal sheet. However, as will be appreciated, the magnitude of the impact must not be so great that the stress imposed upon the thread being cut in the metal sheet is in excess of the elastic limit of the metal.

What I claim is:

1. A tool for driving, into sheet metal, a self-tapping screw, comprising a body, a screwdriver bit mounted in said body and capable of rotary motion about its axis and reciprocatory sliding motion in the direction of its axis, a pneumatically driven motor provided in said body to rotate said bit, a pneumatically driven impact means provided in said body to deliver a series of impacts to said bit during rotation of the bit, said impact means comprising a chamber in the body, a free impact piston reciprocable in said chamber, an anvil member against which said piston is impacted, and means to transmit the impact delivered to the anvil member to the bit irrespective of rotation of the bit, and a single, manually operable control valve to feed air under pressure to said motor and to said chamber to cause simutlaneous rotation and impacting of the bit.

2. A tool according to claim 1 including a control device connected with the body of the tool and controlling the period of application of impacting to the screwdriver bit, said control device being adjustable for setting in accordance with the physical characteristics of the workpiece and screw so as to achieve a pre-determined period of impacting simultaneously with rotary motion of the screwdriver bit.

3. A tool according to claim 2 wherein the impacting device comprises a pneumatically operated impact piston which reciprocates in a fixed path of travel within the body of the tool and wherein the control device comprises a mechanical sensing device in the form of a sleeve mounted on the front of the tool body and adjustable thereon in the axial direction of the screwdriver bit, said sleeve enclosing the screwdriver bit and having its outer end projecting forwardly of the bit such that when the screw engaged by the bit is in contact with the workpiece, movement of the tool body to engage the outer end of said sleeve with the workpiece causes rearwards movement of the screwdriver bit relative to the tool body to bring the rear end of the screwdriver bit into the path of travel of said impact piston.

4. A tool according to claim 3 wherein the impact piston reciprocates in a passage in the body of the tool, which passage is axially in line with the screwdriver bit and the rear end of the bit is slidably and rotatably engaged in the forward end of such passage, the arrangement being such that in the "at-rest" position of the tool prior to engagement with a workpiece, the screwdriver bit is in a forward position in which its rear end is out of the path of travel of the impact piston.

5. A tool according to claim 4 wherein the tool body has an inlet for a supply of compressed air controlled by a single manually operated valve supplying compressed air to the motor for rotating the bit and also supplying compressed air to the control valve of the impacting device, the motor and impacting device being thus operable simultaneously and concurrently.

6. A tool according to claim 1 wherein there is gearing between the output shaft of the motor for rotating the bit and the bit itself, such gearing including a gear wheel having a central opening in which the screwdriver bit is mounted in rotary driving engagement with said gear wheel but capable of sliding relative thereto in the axial direction of the screwdriver bit.

7. A tool according to claim 3 wherein said sleeve comprising the mechanical sensing device is mounted in adjustable telescopic engagement with a further sleeve mounted on the forward end of the tool body and projecting forwardly therefrom in the axial direction of the screwdriver bit.

8. A tool according to claim 2 wherein the impact piston reciprocates in the passage in the body of the tool, which passage is axially in line with the screwdriver bit, the arrangement being such that in the "at-rest" position of the tool, the screwdriver bit is in a rearward position in which its rear end is in the path of travel of the impact piston and wherein said control device comprises a two-part clutch, both parts of which have driving engagement with the screwdriver bit, the clutch parts having opposed engaging faces normally in face-to-face engagement but being axially separated by reaction force when the screwdriver bit encounters torque resistance to rotation of a predetermined value, said axial separation of the clutch parts causing movement of the screwdriver bit to bring its rear end out of the path of travel of the impact piston.

9. A tool according to claim 2 wherein the impacting device comprises a pneumatically actuated piston reciprocating within a passage in the body of the tool axially aligned with the screwdriver bit and wherein the control device comprises a pneumatically operated timing device including a valve controlling supply of air to the piston for cutting off the supply of compressed air to the impacting device after a predetermined period of time.

References Cited

UNITED STATES PATENTS

| | | | |
|---|---|---|---|
| 1,731,979 | 10/1929 | Krummel | 173—93.7 |
| 2,371,622 | 3/1945 | Hawkins | 29—240.5 |
| 2,929,134 | 3/1960 | Mosher | 29—240 |
| 3,245,137 | 4/1966 | Neuschotz | 29—254X |
| 3,289,290 | 12/1966 | Sandor | 29—240X |
| 3,388,621 | 6/1968 | Neuschotz | 29—240X |
| 3,392,793 | 7/1968 | Pauley | 173—93.7 |
| 3,466,730 | 9/1969 | McHenry | 29—240X |
| 1,299,232 | 4/1919 | Rosenberg | 29—240X |

WAYNE A. MORSE, Jr., Primary Examiner

U.S. Cl. X.R.

29—252, 254; 81—52.35; 173—93.7